United States Patent
Park et al.

(10) Patent No.: US 8,887,139 B2
(45) Date of Patent: Nov. 11, 2014

(54) VIRTUAL SYSTEM AND METHOD OF ANALYZING OPERATION OF VIRTUAL SYSTEM

(75) Inventors: Mi-Kyoung Park, Seoul (KR); Jong Moo Choi, Yongin-si (KR); Jong Hwa Kim, Yongin-si (KR); Hee Kwon Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1052 days.

(21) Appl. No.: 12/911,997

(22) Filed: Oct. 26, 2010

(65) Prior Publication Data

US 2011/0113180 A1 May 12, 2011

(30) Foreign Application Priority Data

Nov. 6, 2009 (KR) .......................... 10-2009-0107118

(51) Int. Cl.
*G06F 9/44* (2006.01)
*G06F 9/455* (2006.01)

(52) U.S. Cl.
CPC ........ *G06F 9/45533* (2013.01); *G06F 9/45554* (2013.01)
USPC ........................................................ 717/128

(58) Field of Classification Search
None
See application file for complete search history.

(56) References Cited

U.S. PATENT DOCUMENTS

| | | | |
|---|---|---|---|
| 7,356,735 B2 * | 4/2008 | Bennett et al. ................... | 714/34 |
| 2002/0073063 A1 * | 6/2002 | Faraj ................................. | 707/1 |
| 2005/0240819 A1 * | 10/2005 | Bennett et al. ................... | 714/34 |
| 2007/0050763 A1 | 3/2007 | Kagan et al. | |
| 2008/0070628 A1 * | 3/2008 | Chang .............................. | 455/558 |
| 2009/0070776 A1 | 3/2009 | Dahlstedt | |
| 2009/0089815 A1 | 4/2009 | Manczak et al. | |
| 2009/0248611 A1 * | 10/2009 | Xu et al. ........................... | 707/1 |
| 2011/0004935 A1 * | 1/2011 | Moffie et al. ..................... | 726/23 |

FOREIGN PATENT DOCUMENTS

KR  1020090009866 A  1/2009

* cited by examiner

*Primary Examiner* — Philip Wang
(74) *Attorney, Agent, or Firm* — Volentine & Whitt, PLLC

(57) ABSTRACT

A virtual system comprises hardware, a virtualization layer virtualizing the hardware, a virtual machine monitor, a user domain operating using the virtualized hardware, and a root domain operating using the virtualized hardware and managing the user domain. The virtual machine monitor analyzes an operation performed by the user domain in real time and stores resulting analysis information in the root domain.

20 Claims, 9 Drawing Sheets

VIRTUAL SYSTEM AND METHOD OF ANALYZING OPERATION OF VIRTUAL SYSTEM

CROSS-REFERENCE TO RELATED APPLICATIONS

This application claims priority under 35 U.S.C. §119 to Korean Patent Application No. 10-2009-0107118 filed on Nov. 6, 2009, the disclosure of which is hereby incorporated by reference in its entirety.

BACKGROUND

Embodiments of the inventive concept relate generally to virtualization technology. More particularly, embodiments of the inventive concept relate to virtual systems and methods of analyzing the operation of virtual systems.

In a virtual system, a virtualization layer is installed on physical hardware resources to create virtual hardware resources. The virtual hardware resources, which often take the form of virtual machines, can be used to run programs such as operating systems and application programs. The most common form of virtualization layer is a type of virtualization software referred to as a hypervisor. Examples of hypervisors include Xen or VMware hypervisors.

Xen hypervisors can virtualize hardware resources in IA-32, x86-64, IA-64 and Power PC 970 architectures. VMware hypervisors can virtualize hardware resources of x86 compatible computers, such as Vmware workstations, Vmware servers, and a VM players. Some versions of Xen support only para-virtualization, so conventional operating systems may require source modification in order to run on the hypervisor. Other versions of Xen support full-virtualization, so conventional operating systems can run on the hypervisor without of source modification.

One benefit of virtualization is that it can allow multiple operating systems to run on a single set of physical hardware resources, even though each individual operating system may require access to a separate set of virtual hardware resources. For instance, each operating system may require its own central processing unit (CPU), memory, network interface, and so on. These resources can be provided in virtual form through the virtualization layer.

SUMMARY

According to an embodiment of the inventive concept, a virtual system comprises a physical hardware platform, a virtualization layer that virtualizes the physical hardware platform to create virtual hardware, a virtual machine monitor running on the physical hardware platform, a user domain operating on the virtual hardware, and a root domain operating on the virtual hardware and managing the user domain. The virtual machine monitor analyzes operations performed by the user domain in real time and stores resulting analysis information in the root domain.

In certain embodiments, the physical hardware platform comprises at least one central processing unit.

In certain embodiments, the virtual machine monitor comprises an execution tracer that traces information regarding a current instruction of a virtual central processing unit of the user domain.

In certain embodiments, the execution tracer determines whether to store the traced information in the root domain.

In certain embodiments, the execution tracer traces the information after the virtual central processing unit executes the current instruction.

In certain embodiments, the virtualized central processing unit executes the current instruction according to the traced information after the traced information is stored in the root domain.

In certain embodiments, the execution tracer comprises an instruction pointer (IP) tracker that reads an instruction address stored in an instruction pointer register and reads information regarding the current instruction from a memory region indicated by the instruction address, a decoder that disassembles the information read by the IP tracker, and extracts from the information a data address of a memory reference, an analyzer that converts the instruction address to a first physical address and converts the data address to a second physical address based on a page table, and a logger that stores the instruction address, the first physical address, the data address, the second physical address, and the disassembled information.

In certain embodiments, the root domain comprises a virtual machine trace interface that receives from the execution tracer the instruction address, the first physical address, the data address, the second physical address, and the disassembled information.

In certain embodiments, the user domain comprises at least one virtual machine, the at least one virtual machine comprising virtual hardware running on the virtualization layer, a guest operating system executed on the virtual hardware, and at least application program executed on the guest operating system.

In certain embodiments, the user domain comprise a fully virtual machine.

In certain embodiments, the virtual machine monitor comprises an address converter that detects a memory access instruction of the user domain and converts a memory address of the memory access instruction into a different address.

In certain embodiments, the address converter converts the memory address into the different address upon detecting that a number of previous access operations to the memory address exceeds a predetermined value.

In certain embodiments, the memory address is an address of a NAND flash memory device.

In certain embodiments, the virtual machine monitor analyzes operations performed by an operating system and an application program of the user domain and determines a relationship between the operating system and the application program based on the analysis of the operations performed by the operating system and the application program of the user domain.

In certain embodiments, the virtual machine monitor operates as a debugger for an application program.

According to another embodiment of the inventive concept, a virtual system comprises a physical hardware platform, a virtualization layer that virtualizes the physical hardware platform to create virtual hardware, a virtual machine monitor running on the physical hardware platform, and a user domain operating using the virtual hardware. The virtual machine monitor analyzes operations performed by the user domain in real time and stores resulting analysis information in the user domain.

According to still another embodiment of the inventive concept, a method of executing an instruction of a virtual system comprises tracing instruction information of a virtual domain of the virtual system, storing the traced instruction information in another virtual domain of the virtual system, and executing an instruction according to the instruction information.

In certain embodiments, tracing the instruction information comprises reading an instruction address stored in an instruction pointer register of a central processing unit, reading the instruction information from a memory region indicated by the instruction address, and analyzing the instruction information.

In certain embodiments, the method further comprises determining whether to store the traced instruction information.

In certain embodiments, the method further comprises detecting a repetition of the instruction, and storing a number of repetitions of the instruction.

BRIEF DESCRIPTION OF THE DRAWINGS

The drawings illustrate various embodiments of the inventive concept. In the drawings, like reference numbers indicate like features.

DETAILED DESCRIPTION OF THE EMBODIMENTS

Embodiments of the inventive concept are described below with reference to the accompanying drawings. These embodiments are presented as teaching examples and should not be construed to limit the scope of the inventive concept.

In general, embodiments of the inventive concept relate to systems and methods for analyzing the performance of programs running on virtual machines. Some of these systems and methods can be useful in software test or analysis platforms using virtual machine technology. Some of these systems can be useful for analyzing hardware access in memory systems comprising nonvolatile memories.

Figure 1:
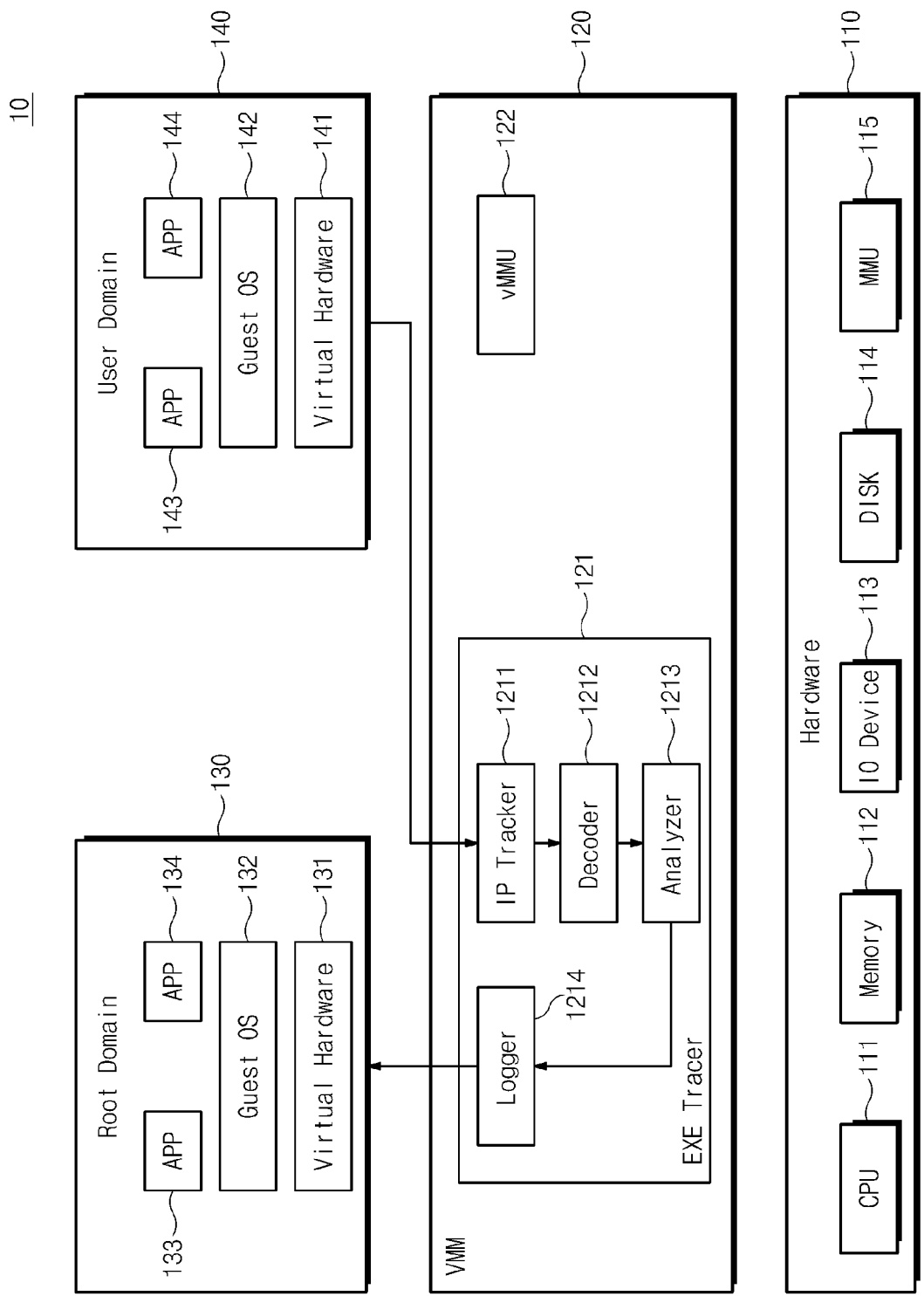
FIG. 1 illustrates a virtual system according to an embodiment of the inventive concept.

FIG. 1 illustrates a virtual system 10 according to an embodiment of the inventive concept.

Referring to FIG. 1, virtual system 10 comprises a physical hardware platform 110, a virtual machine monitor 120, a root domain 130, and a user domain 140. Virtual machine monitor 120 performs real-time analysis of operations performed by an operating system and application programs of user domain 140.

Hardware platform 110 comprises at least one CPU 111, a memory 112, an input/output device 113, a disk 114, and a memory manager unit 115.

Virtual machine monitor 120 is installed in a virtualization layer of hardware platform 110. The virtualization layer typically comprises virtualization software. The virtualization layer allows a single physical hardware resource to be used as a plurality of virtual hardware resources. Domains 130 and 140 are installed on the virtualization layer and comprise a plurality of operating systems 132 and 142 using the virtual hardware resources. Each of operating systems 132 and 142 can comprise, for instance, Windows XP, Windows Vista, Windows CE, Windows 7, UNIX, Linux, or Mac OS X.

Virtual machine monitor 120 comprises an execution tracer 121 and a virtual memory manager unit 122. Execution tracer 121 analyzes the execution of programs in user domain 140 and transfers resulting analysis information to root domain 130. The programs executed in user domain 140 can comprise, for instance, guest operating system 142 and application programs 143 and 144.

Execution tracer 121 comprises an IP tracker 1211, a decoder 1212, an analyzer 1213, and a logger 1214.

IP tracker 1211 reads and stores a value of an instruction pointer register of CPU 111. CPU 111 reads instruction information from a region of memory 112 based on the value of the instruction pointer register, and executes a current instruction based on the instruction information. Following the current instruction, CPU 111 prepares to execute a next instruction.

IP tracker 1211 sets a trap flag bit in an EFLAG register of CPU 111 to generate a trap at the next instruction. The EFLAG register stores values corresponding to various types of interrupts of CPU 111. Where the trap flag bit is set, a trap is generated at the next instruction. Following execution of the trap, IP tracker 1211 resets the trap flag bit of the EFLAG register.

Decoder 1212 reads instruction information from a region of memory 112 based on the address of the next instruction. The instruction information comprises binary-type data. Decoder 1212 decodes the instruction information to detect whether it includes a memory reference. If so, decoder 1212 stores the memory address of the next instruction and an address of the memory reference. In this example, the memory reference indicates an operation for accessing memory 112 or disk 114.

Analyzer 1213 converts the address stored in the instruction pointer register and the memory address in the instruction information to physical addresses using a page table. The address stored in the instruction pointer register and the address stored in the instruction information are virtual addresses. The page table comprises virtual addresses and information identifying corresponding physical addresses. In addition, the page table can comprise virtual addresses and information regarding corresponding logical addresses. The logical addresses can be system level addresses of disk 114. The logical addresses can be converted to physical addresses of a memory by a separate mapping table.

Logger 1214 receives execution information obtained by instruction pointer tracker 1211, decoder 1212, and analyzer 1213, and transfers the execution information to root domain 130. This transfer can be performed, for instance, using a ring buffer. Although not illustrated, logger 1214 typically stores the execution information in a virtual machine trace interface of root domain 130. The virtual machine trace interface controls starting and stopping of information collection, single step control, and breakpoint control by root domain 130. In addition, the virtual machine trace interface can display the execution information transferred from logger 1214 on a graphic user interface or store the transferred execution information as a file. The stored execution information can be used to manage user domain 140. The virtual machine trace interface can be included in guest operating system 132 of root domain 130.

Virtual memory manager unit 122 controls memory access between guest operating systems 132 and 142.

Root domain 130 executes a control program for managing user domain 140 and comprises a driver for accessing user domain 140. Accordingly, a final input/output processing operation requested at user domain 140 can be performed at root domain 130. Root domain 130 periodically measures and adjust a confidence level of an application program executed by user domain 140.

Root domain 130 comprises virtual hardware 131, a guest operating system 132, and application programs 133 and 134. Although two application programs 133 and 134 are illustrated in FIG. 1, root domain 130 can have fewer or additional application programs.

User domain 140 comprises a virtual machine that runs a user-designated guest operating system. User domain 140 comprises virtual hardware 141, a guest operating system 142, and application programs 143 and 144. Although two application programs 143 and 144 are illustrated in FIG. 1, user domain 130 can have fewer or additional application programs.

Guest operating system 142 runs on virtual hardware 141 created by virtual machine monitor 120. Alternatively, guest operating system 142 can be directly executed on physical hardware.

In various alternative embodiments, user domain 140 can comprise a para-virtualization domain or a hardware-assisted virtual machine domain. A para-virtualization domain uses a guest operating system adopting virtualization technology. For instance, the para-virtualization domain can use a corrected kernel. The para-virtualization domain can perform scheduling or memory operations and input/output operations while having hypercall-based communication with virtual machine monitor 120. A hypercall is a para-virtualization interface in which a guest operating system is accessible to direct service in a higher level control program.

A hardware-assisted virtual machine domain is a virtualization technology without code modification or static mapping based on a virtualization technology of a CPU. The virtualization technology of a CPU can be Intel virtualization technology (VT). In Intel VT, higher levels are additionally provided through extension of four privilege levels (e.g., Ring0~Ring3) used in Intel CPU families. For example, a virtual machine monitor can be a first level (Ring0), a guest operating system can be a second level (Ring1), and an application program can be a third level (Ring3).

In Intel VT, four privilege levels are defined as non-root mode and added new levels are defined as root mode. A guest operating system may run in a first level (Ring0) of the non-root mode, but run in the root mode when a specific virtualization-related instruction is executed. In the root mode, a virtual machine monitor is disposed and a virtualization operation is performed.

Virtual machine monitor 120 processes a hypercall requested at a para-virtualization domain and, where necessary (e.g., for device access), transfers the hypercall to root domain 130. In addition, virtual machine monitor 120 manages a root/non-root mode transition for a virtual machine domain, a virtual machine control structure (VMCS) for maintaining a state of CPU 111 in each mode, and a memory manager unit (MMU).

The VMCS controls entry, execution, and exit of a virtual machine and the behavior of virtual machine instructions. At entry of the virtual machine, virtual machine monitor 120 is in a non-root mode. Upon execution of the virtual machine in the non-root mode, code such as an operating system or application program is executed. At exit of the virtual machine, virtual machine monitor 120 is in a root mode and a control right of CPU 111 is returned to virtual machine monitor 120 running in the root mode.

As indicated by the foregoing, virtual system 10 obtains execution information of guest operating system 142 and application programs 143 and 144 of user domain 140 in real time by tracing execution information in virtual machine monitor 120. Based on the execution information, a memory reference pattern of guest operating system 142 and application programs 143 and 144 can be analyzed without analyzing original source code. Moreover, virtual machine monitor 120 can analyze the memory reference patterns of program execution system 10 as a black box.

Virtual system 10 can be used to analyze execution of an application program executed in an operating system, to analyze a relationship between an application in a virtual operating system and an operating system, analyze an access method of resources of a virtual operating system, and analyze or debug an operation of an operating system which is being executed at the virtual machine monitor.

Figure 2:
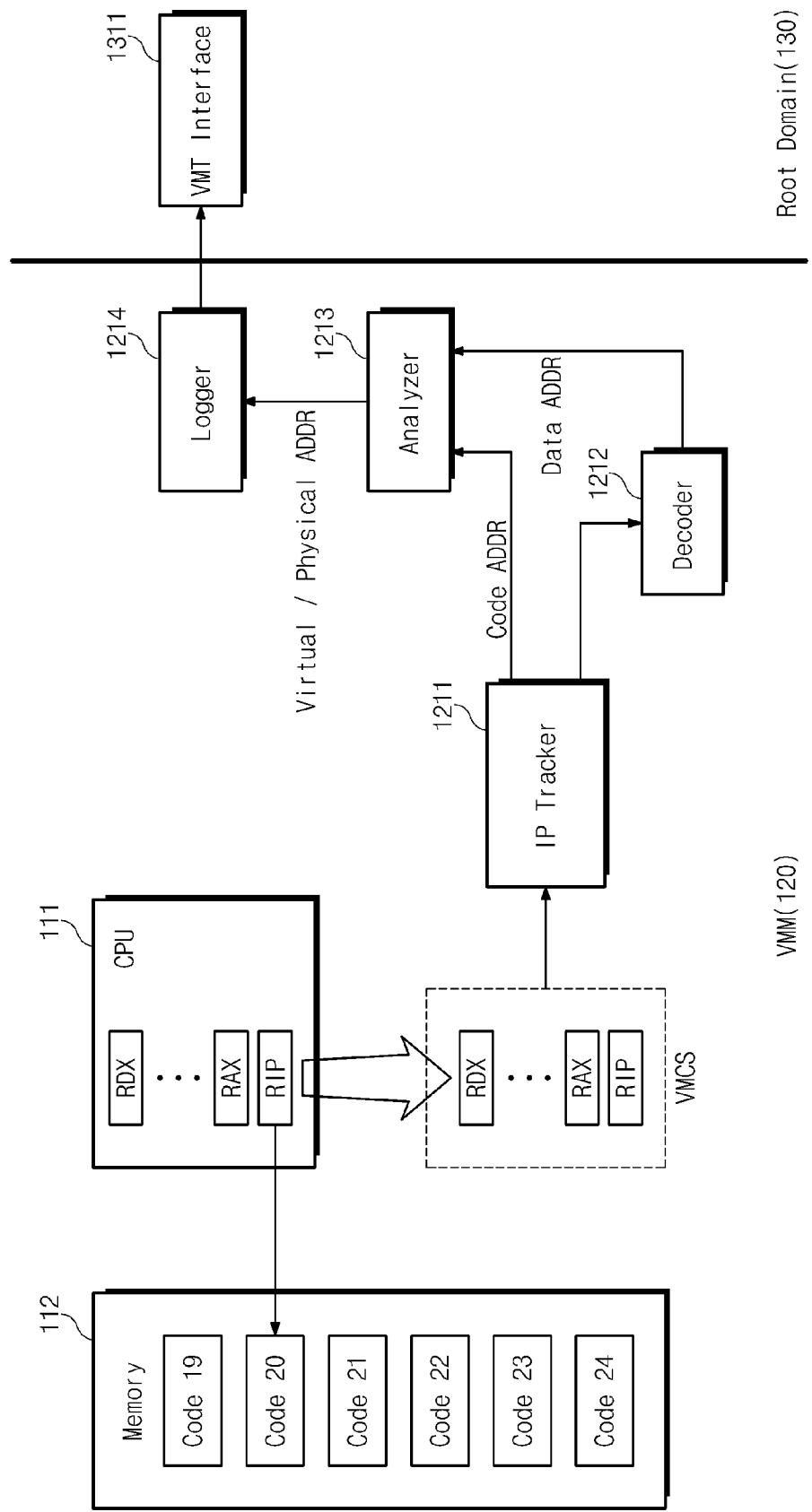
FIG. 2 illustrates the operation of an execution tracer shown in FIG. 1.

FIG. 2 illustrates the operation of execution tracer 121 shown in FIG. 1.

Referring to FIG. 2, a trap is generated upon execution of an instruction by guest operating system 142. In response to the trap, IP tracker 1211 extracts an instruction address Code ADDR from an instruction pointer register RIP of CPU 111, and extracts instruction information from a location of memory 112 corresponding to instruction address Code ADDR. For instance, in the example of FIG. 2, IP tracker 1211 extracts instruction information labeled Code 20, which is indicated by the instruction address stored in instruction pointer register RIP. IP tracker 1211 transfers the extracted instruction information to decoder 1212, and transfers the extracted instruction address to analyzer 1213.

Decoder 1212 receives and disassembles the instruction information to detect whether it refers to data stored in memory 112 or a disk 114. In other words, decoder 1212 determines whether the instruction information contains a memory reference. Where the instruction information contains a memory reference, decoder 1212 extracts a data address Data ADDR of the memory reference, and transfers address Data ADDR to analyzer 1213.

Analyzer 1213 receives instruction address Code ADDR from IP tracker 1211, and data address Data ADDR from decoder 1212, and generates a physical address based on data address Data ADDR.

Logger 1214 receives and stores the physical address generated by analyzer 1213, and transfers a copy of the physical address to a virtual machine trace interface 1311.

The performance of execution tracer 121 can be improved or modified in a variety of ways. For example, execution tracer 121 can avoid generating a trap where an instruction is repeated. Instead, execution tracer 121 can simply record a number of repetitions of the instruction. This can reduce the overhead of extracting execution information for each repetition. As another example, execution tracer 121 can extract a virtual address or a physical address using a virtual table maintained in virtual memory manager unit 122 to perform an address conversion operation at high speed. Where an error occurs in the virtual table, execution tracer 121 can directly access a page table. As another example, execution tracer 121 can avoid generating a trap where a block of instructions is repeated. Execution tracer 121 can represent the block of instructions as a symbol and generate a trap at a next instruction following execution of the block of instructions. As yet another example, execution tracer 121 can decrease a number of address conversions by introducing gathering when there is a need for information transmission between virtual machine monitor 120 and root domain 130.

Figure 3:
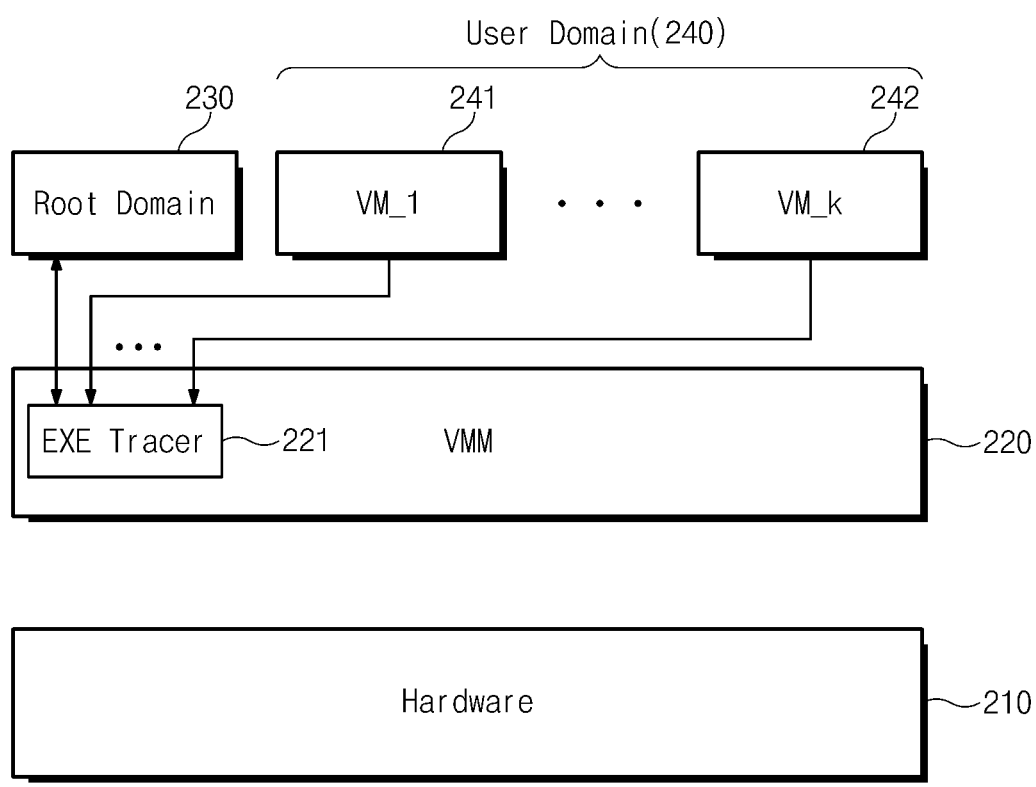
FIG. 3 illustrates a virtual system according to another embodiment of the inventive concept.

FIG. 3 illustrates a virtual system 20 according to another embodiment of the inventive concept.

Referring to FIG. 3, virtual system 20 comprises a root domain 230, a user domain 240, a virtual machine monitor 220, and a physical hardware platform 210.

User domain 240 comprises "k" virtual machines 241 and 242 (k≥2). Although not shown in FIG. 3, each of virtual machines 241 and 242 comprises at least one virtual hardware platform, a guest operating system, and at least one application program.

Virtual machine monitor 220 comprises an execution tracer 221 that analyzes the operation of virtual machines 241 and 242 and transfers resulting analysis information to root domain 230. Execution tracer 221 has substantially the same structure as execution tracer 121 shown in FIG. 1.

In some embodiments, execution tracers 121 and 221 analyze the operation of fully virtual machines. In some embodiments, execution tracers 121 and 221 can also be used to analyze the operation of para-virtual machines.

Figure 4:
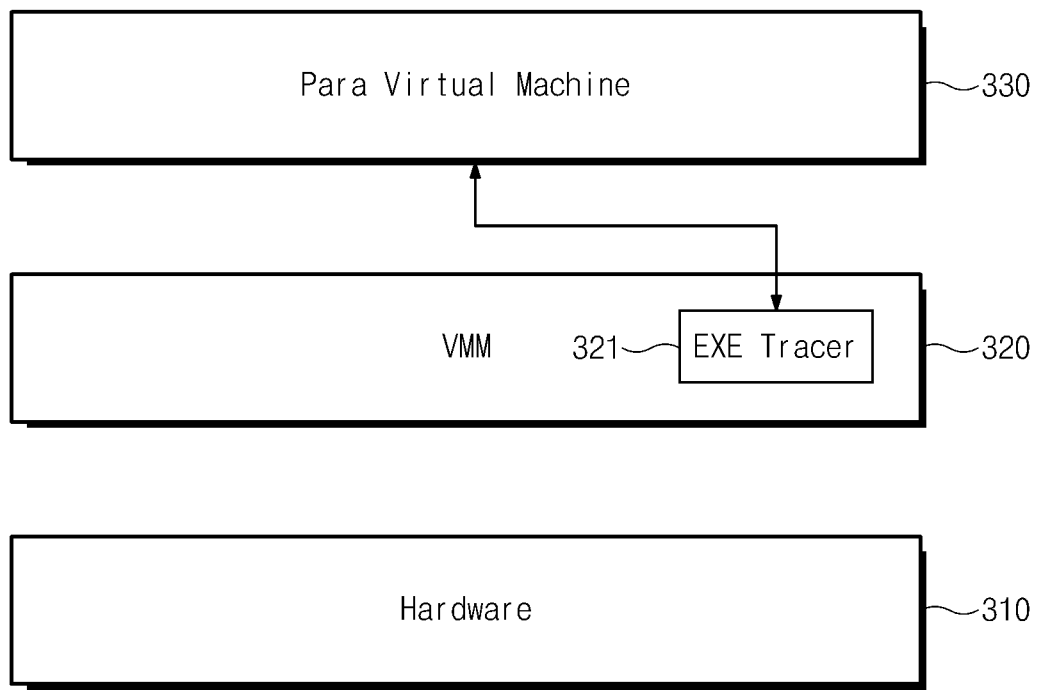
FIG. 4 illustrates a virtual system according to another embodiment of the inventive concept.

FIG. 4 illustrates a virtual system 30 according to yet another embodiment the inventive concept.

Referring to FIG. 4, virtual system 30 comprises a physical hardware platform 310, a virtual machine monitor 320, and a para-virtual machine 330. Virtual machine monitor 320 comprises an execution tracer 321 that analyzes the operation of para-virtual machine 330 and transfers resulting analysis information to para-virtual machine 330. Execution tracer 321 has substantially the same structure as execution tracer 121 shown in FIG. 1.

Each of virtual systems 10, 20, and 30 comprises a virtual machine monitor installed on a hardware platform. Such a virtual system is called a hardware-based virtual system. The inventive concept, however, is not limited to hardware-based virtual systems. For instance, in some embodiments, a virtual machine monitor is implemented in a host operating system. Such a virtual system is called an OS-based virtual system. An example OS-base virtual system can be implemented using a VMware workstation and a virtual box as virtualization software. In an OS-based virtual system, virtualization hardware can be generated by the host operating system. An OS-based virtual system can be implemented to readily install and use a virtual machine monitor.

Figure 5:
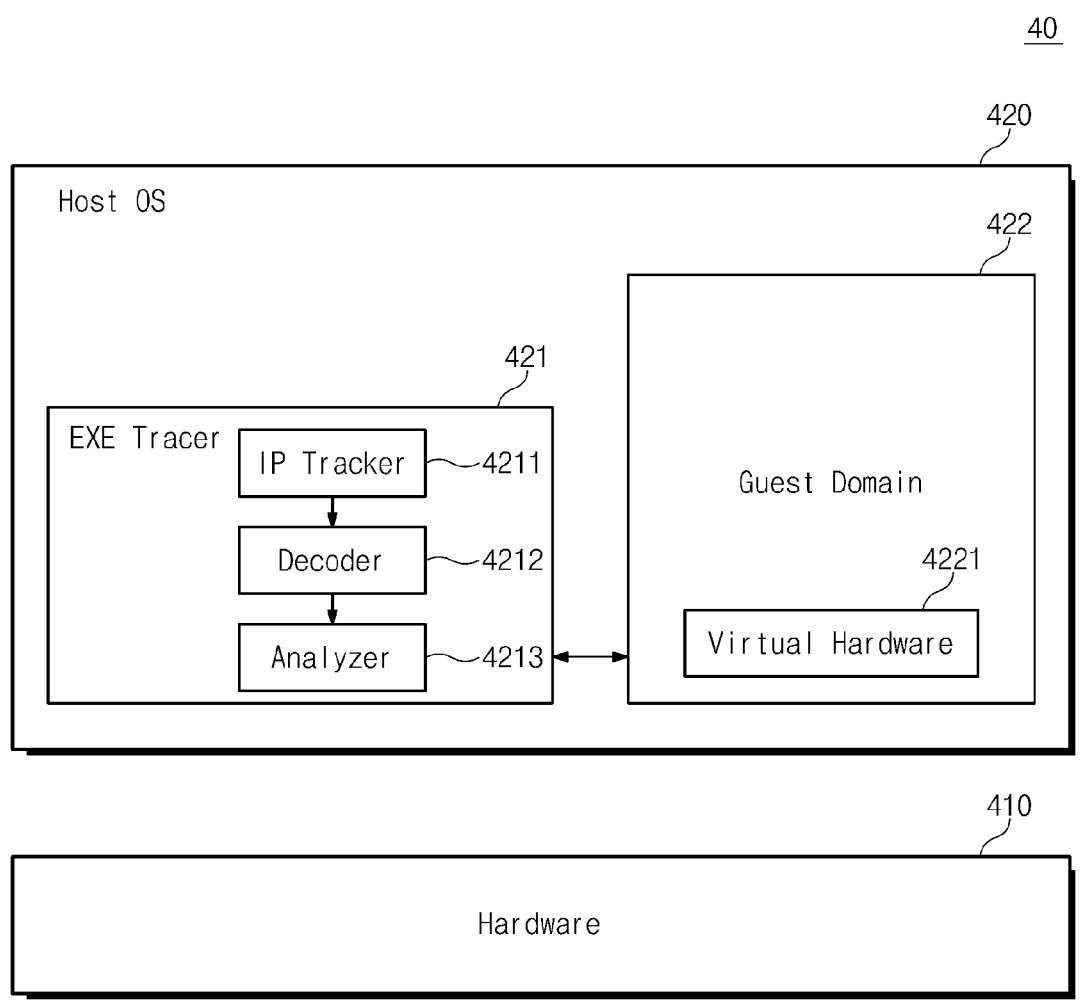
FIG. 5 illustrates an OS-based virtual system according to an embodiment of the inventive concept.

FIG. 5 illustrates an OS-based virtual system 40 according to an embodiment of the inventive concept.

Referring to FIG. 5, OS-based virtual system 40 comprises a hardware platform 410 and a host operating system 420. Host operating system 420 comprises an execution tracer 421 and a guest domain 422. Execution tracer 421 analyzes the operation of guest domain 422.

Execution tracer 421 comprises an IP tracker 4211, a decoder 4212, and an analyzer 4213. IP tracker 4211 extracts instruction information to be executed by hardware platform 410, and decoder 4212 disassembles the extracted instruction information. Analyzer 4213 converts a virtual address extracted from the disassembled instruction information to a physical address. Where the instruction information contains a data reference of a memory in hardware platform 410 (e.g., in memory 112 of FIG. 1), analyzer 4213 reads data from memory 112. In addition, where the instruction information contains a data reference of a disk (e.g., in disk 114 of FIG. 1), analyzer 4213 reads data from disk 114.

Figure 6:
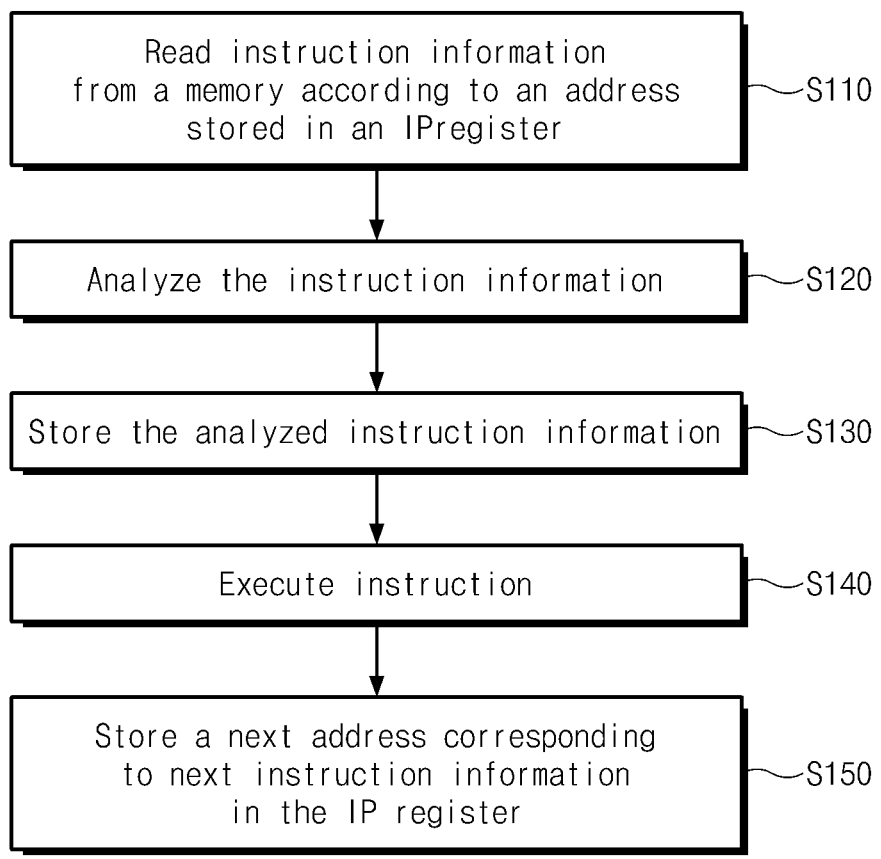
FIG. 6 illustrates a method of executing an instruction in a virtual system according to an embodiment of the inventive concept.

FIG. 6 illustrates a method of executing an instruction in a virtual system according to an embodiment of the inventive concept. For explanation purposes, it will be assumed that the method of FIG. 6 is performed by virtual system 10 of FIG. 1. In the description that follows, example method steps are indicated by parentheses (SXXX).

Referring to FIG. 6, execution tracer 121 reads instruction information from memory 112 according to an address stored in the instruction pointer register of CPU 111 (S110). Execution tracer 121 analyzes the read instruction information to generate instruction analysis information (S120). The instruction analysis information can comprise, for instance, an instruction type, an instruction address, a number of repetition times of an instruction, a physical address corresponding to an instruction address, and data.

A virtual machine trace interface of root domain 130 stores the instruction analysis information after receiving the same from execution tracer 121 (S130). CPU 111 executes an instruction according to the instruction information (S140). Following execution of the instruction, a next address corresponding to next instruction information is stored in an instruction pointer register of CPU 111 and the method returns to step S110 (S150).

The method of FIG. 6 stores all instruction analysis information. However, in alternative embodiments, the instruction analysis information can be selectively stored.

Figure 7:
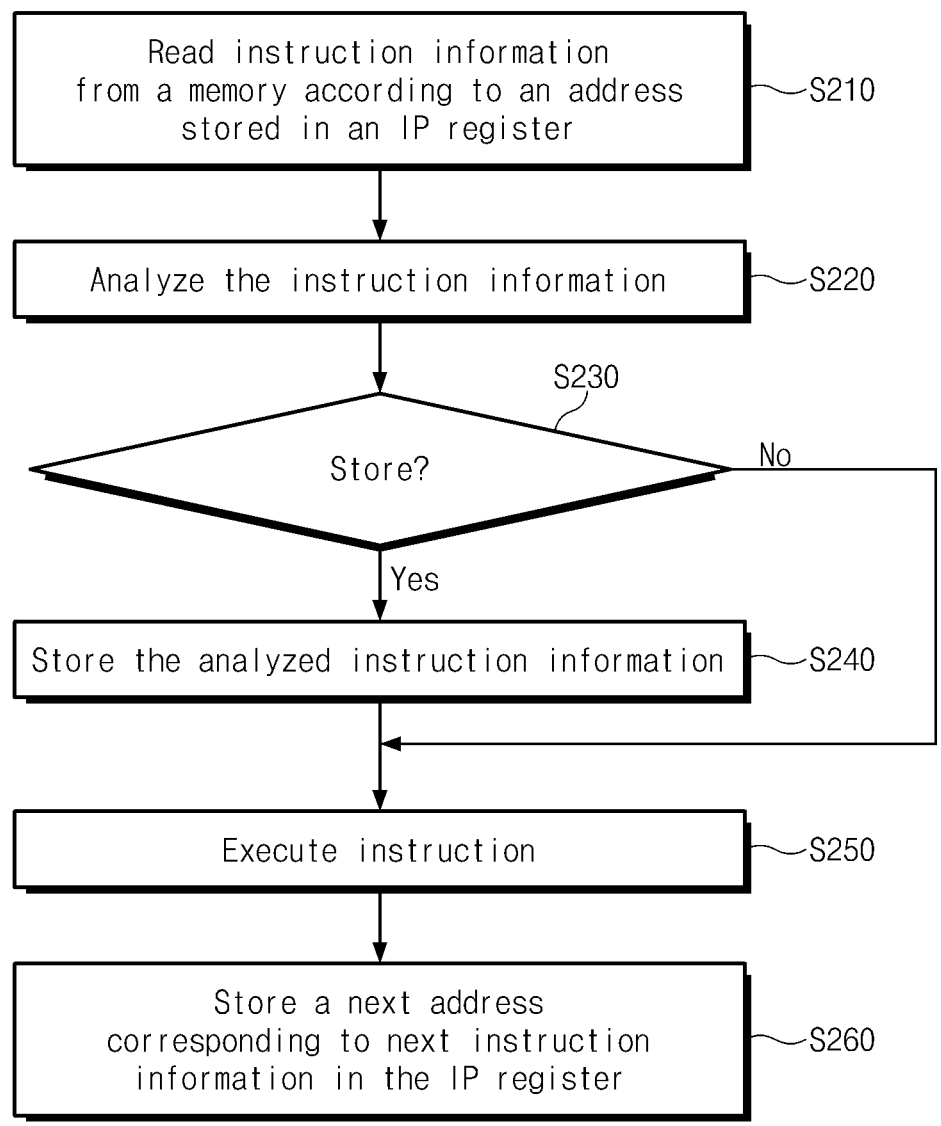
FIG. 7 illustrates a method of executing an instruction in a virtual system according to another embodiment of the inventive concept.

FIG. 7 illustrates a method of executing an instruction in a virtual system according to another embodiment of the inventive concept. For explanation purposes, it will be assumed that the method of FIG. 7 is performed by virtual system 10 of FIG. 1.

Referring to FIG. 7, execution tracer 121 reads instruction information from memory 112 according to an address stored in an instruction pointer register (S210). Execution tracer 121 analyzes the read instruction information to generate instruction analysis information (S220).

Execution tracer 121 determines whether to store the instruction analysis information (S230). This determination can be performed based on the type of instruction or the number of repetition times of the instruction.

Where the method determines to store the instruction analysis information (S230=Yes), a virtual machine trace interface of root domain 130 receives and stores the instruction analysis information (S240). On the other hand, where the method determines not to store the instruction analysis information (S230=No), the method proceeds to step S250, in which CPU 111 executes an instruction according to the instruction information (S250). Upon completion of execution of the instruction, a next address corresponding to next instruction information is stored in the instruction pointer register of CPU 111 (S260). Following step S260, the method returns to step S210.

In the methods of FIGS. 6 and 7, instruction information is analyzed before execution of the corresponding instruction. However, these methods can be modified so that instruction information is analyzed after execution of the corresponding instruction.

Figure 8:
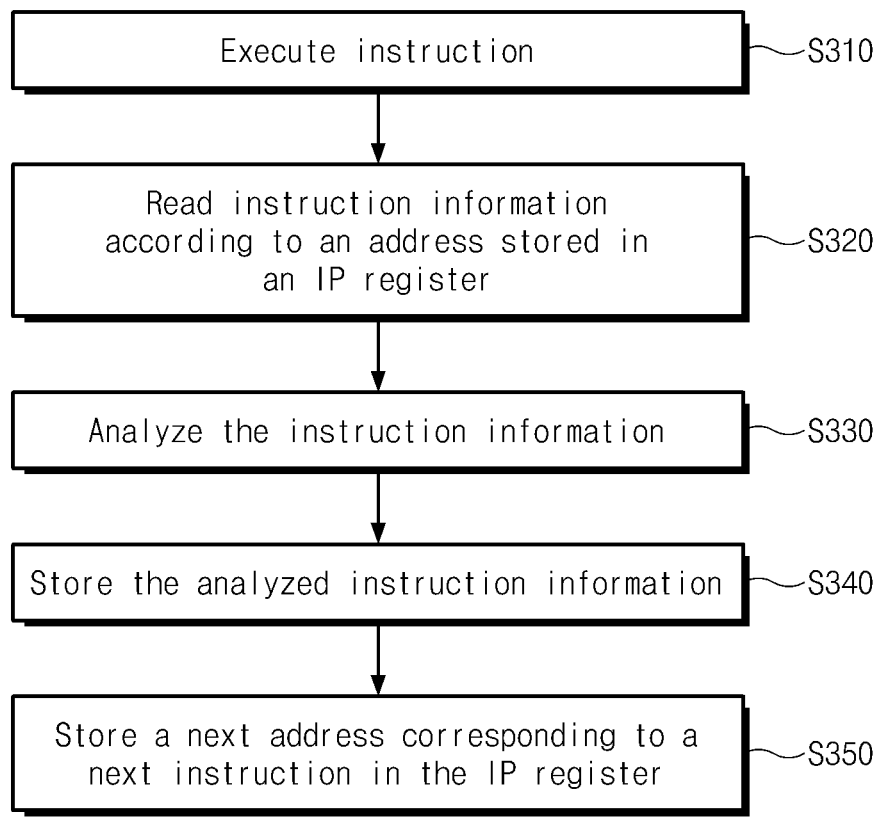
FIG. 8 illustrates a method of executing an instruction in a virtual system according to yet another embodiment of the inventive concept.

FIG. 8 illustrates a method of executing an instruction in a virtual system according to another embodiment of the inventive concept. For explanation purposes, it will be assumed that the method of FIG. 8 is performed by virtual system 10 of FIG. 1.

Referring to FIG. 8, CPU 111 executes an instruction corresponding to an address stored in the instruction pointer register of CPU 111 (S310). Execution tracer 121 then reads instruction information from memory 112 according to the address stored in the instruction pointer register (S320). Execution tracer 121 analyzes the read instruction information to generate instruction analysis information (S330). A virtual machine trace interface of root domain 130 stores the instruction analysis information after receiving the same from execution tracer 121 (S340). A next address corresponding to a next instruction information is stored in an instruction pointer register of CPU 111 (S350). Thereafter, the method returns to step S310.

Figure 9:
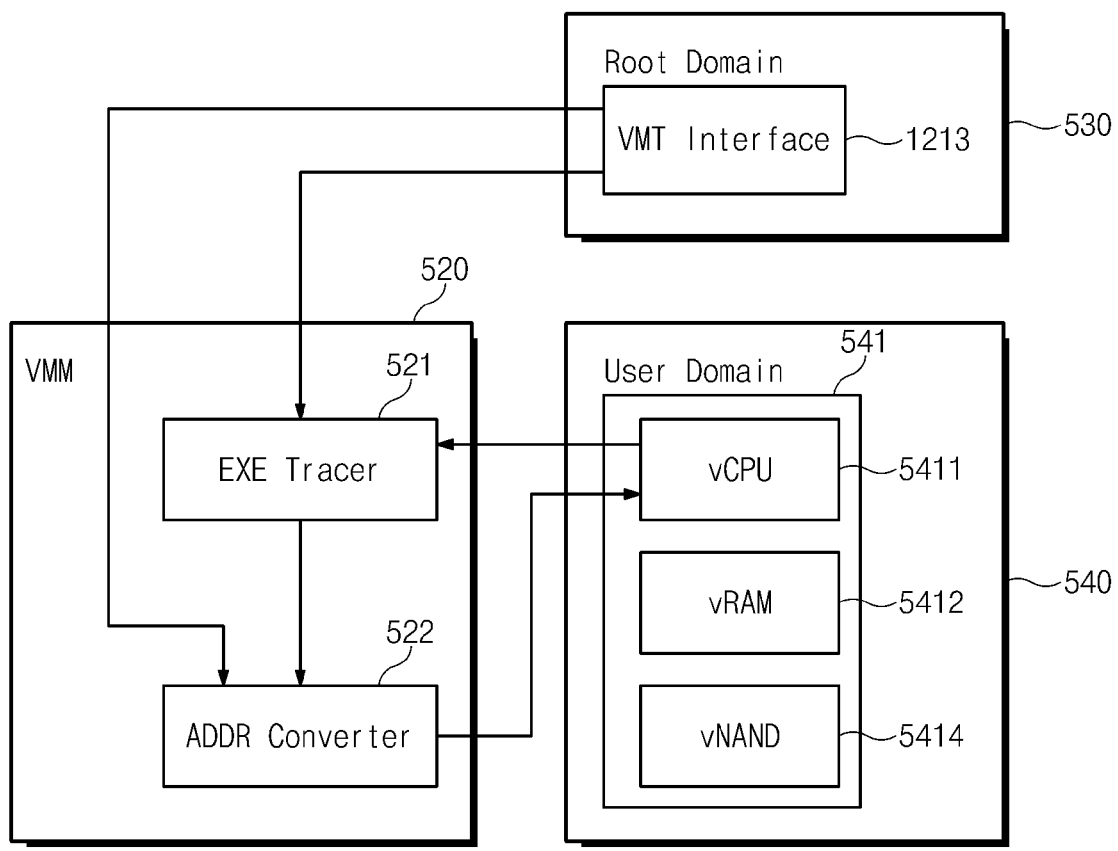
FIG. 9 illustrates a virtual system adapted to improve reliability of a disk according to an embodiment of the inventive concept.

FIG. 9 illustrates a virtual system 50 adapted to improve reliability of a disk according to an embodiment of the inventive concept. The reliability of the disk can be improved by preventing certain disk locations from being accessed more than a predetermined number of times. This can be accomplished by converting frequently accessed disk addresses based on instruction analysis information.

Referring to FIG. 9, virtual system 50 comprises a virtual machine monitor 520, a root domain 530, and a user domain 540.

User domain 540 comprises virtual hardware 541. Virtual hardware 541 comprises a virtual CPU 5411, a virtual RAM 5412, and a virtual NAND flash memory 5414. Virtual CPU 5411 is configured to execute an operating system and application programs of user domain 540. Virtual RAM 5412 is configured to store instruction information, such as code for executing the OS and application programs. Virtual NAND flash memory 5414 is configured to store user data.

Virtual machine monitor 520 comprises an execution tracer 521 and an address converter 522. Execution tracer 521 traces operations of virtual CPU 5411 to obtain trace information, and stores the trace information in a virtual machine trace interface 531 of root domain 530. The stored trace information can comprise, for instance, a number of access times of addresses of virtual NAND flash memory 5414.

Where an address of virtual NAND flash memory 5414 is extracted during an instruction information analysis operation of execution tracer 521, the extracted address is transferred to address converter 522. Address converter 522 determines whether the number of access times of a specific address exceeds a predetermined value, from the access times information of addresses stored in address converter 522. Where the number of access times does not exceed the predetermined value, a corresponding instruction is executed. On the other hand, where the number of access times exceeds the predetermined value, address converter 522 converts the address of virtual NAND flash memory 5414 to a different address and transfers the converted address to virtual CPU 5411. Virtual CPU 5411 executes an instruction to reflect the converted address of virtual NAND flash memory 5414.

In certain embodiments, the virtual systems of FIGS. 1 through 9 are implemented in a solid state disk (SSD). The SSD typically comprises a plurality of flash memory devices and an SSD controller. The SSD controller typically comprises a CPU, an interface, a cache buffer, and a flash interface. The interface exchanges data with a host under the control of the CPU. This exchange can be made by a protocol such as an ATA protocol. The interface can comprise, for instance, a serial advanced technology attachment (SATA) interface, a parallel advanced technology attachment (PATA) interface, or an external SATA (ESATA).

Where a virtual system of FIGS. 1 through 9 is implemented in an SSD, techniques such as those described in relation to FIG. 9 can be used to improve the reliability of the flash memory devices.

Data input from the host through the interface or data to be transferred to the host is transferred via the cache buffer without passing through a CPU bus. The cache buffer temporarily stores data transferred between an external entity and flash memory devices. The cache buffer can also be used to store a program to be run by the CPU. The cache buffer can be regarded as a type of buffer memory and configured using a static random access memory (SRAM).

The flash interface interfaces between flash memory devices used as storage devices and the SSD. In various embodiments, the flash interface can be configured to support a NAND flash memory, a One-NAND flash memory, a multi-level flash memory, and a single-level flash memory. In addition to an SSD, the virtual systems described above can be applied to a variety of other electronic appliances.

The virtual systems of FIGS. 1 through 9 can perform a variety of analyses. For instance, in some embodiments, virtual systems analyze operations performed by operating systems and application programs running in a virtualized environment. In some embodiments, virtual systems analyze relationships between an operating system and application programs running in a virtualized environment. In some embodiments, a virtual system analyzes resource access by operating systems and application programs running in a virtualized environment. In some embodiments, a virtual system analyzes the operation of an operating system or application programs running on a virtual machine monitor. In some embodiments, virtual systems analyze the use of resources of a virtual operating system.

As indicated by the foregoing, certain embodiments of the inventive concept provide virtual systems that perform real-time analysis of operations performed by operating systems and application programs running in a virtual environment. The real-time analysis can be used to manage the operation of the operating systems and application programs and the use of resources in the virtual systems.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:
1. A virtual system, comprising:
a physical hardware platform;
a virtualization layer that virtualizes the physical hardware platform to create virtual hardware;
a virtual machine monitor running on the physical hardware platform;
a user domain operating on the virtual hardware; and
a root domain operating on the virtual hardware and managing the user domain,
wherein the virtual machine monitor analyzes operations performed by the user domain in real time and stores resulting analysis information in the root domain,
wherein the virtual machine monitor comprises an execution tracer that traces information regarding a current instruction of a virtual central processing unit of the user domain, and
wherein the execution tracer comprises:
an instruction pointer (IP) tracker that reads an instruction address stored in an instruction pointer register and reads information regarding the current instruction from a memory region indicated by the instruction address;

a decoder that disassembles the information read by the IP tracker, and extracts from the information a data address of a memory reference;

an analyzer that converts the instruction address to a first physical address and converts the data address to a second physical address based on a page table; and a logger that stores the instruction address, the first physical address, the data address, the second physical address, and the disassembled information.

2. The virtual system of claim 1, wherein the physical hardware platform comprises at least one central processing unit.

3. The virtual system of claim 1, wherein the execution tracer determines whether to store the traced information in the root domain.

4. The virtual system of claim 1, wherein the execution tracer traces the information after the virtual central processing unit executes the current instruction.

5. The virtual system of claim 1, wherein the virtualized central processing unit executes the current instruction according to the traced information after the traced information is stored in the root domain.

6. The virtual system of claim 1, wherein the root domain comprises a virtual machine trace interface that receives from the execution tracer the instruction address, the first physical address, the data address, the second physical address, and the disassembled information.

7. The virtual system of claim 1, wherein the virtual machine monitor analyzes operations performed by an operating system and an application program of the user domain and determines a relationship between the operating system and the application program based on the analysis of the operations performed by the operating system and the application program of the user domain.

8. The virtual system of claim 1, wherein the virtual machine monitor operates as a debugger for an application program.

9. A virtual system, comprising:
a physical hardware platform;
a virtualization layer that virtualizes the physical hardware platform to create virtual hardware;
a virtual machine monitor running on the physical hardware platform;
a user domain operating on the virtual hardware; and
a root domain operating on the virtual hardware and managing the user domain,
wherein the virtual machine monitor analyzes operations performed by the user domain in real time and stores resulting analysis information in the root domain,
wherein the virtual machine monitor comprises an address converter that detects a memory access instruction of the user domain and converts a memory address of the memory access instruction into a different address, and
wherein the address converter converts the memory address into the different address upon detecting that a number of previous access operations to the memory address exceeds a predetermined value.

10. The virtual system of claim 9, wherein the user domain comprises at least one virtual machine, the at least one virtual machine comprising:
at least a portion of the virtual hardware running on the virtualization layer;
a guest operating system executed on the virtual hardware; and
at least application program executed on the guest operating system.

11. The virtual system of claim 9, wherein the user domain comprise a fully virtual machine.

12. The virtual system of claim 9, wherein the memory address is an address of a NAND flash memory device.

13. The virtual system of claim 9,
wherein the virtual machine monitor is configured to analyze operations performed by the user domain in real time and to store resulting analysis information in the user domain.

14. The virtual system of claim 9, wherein the virtual machine monitor is configured to analyze operations performed by an operating system and an application program of the user domain and to determine a relationship between the operating system and the application program based on the analysis of the operations performed by the operating system and the application program of the user domain.

15. A method of monitoring a user domain of a virtual system, the method comprising:
virtualizing a physical hardware platform to create virtual hardware;
operating the user domain on the virtual hardware;
operating a root domain on the virtual hardware, the root domain managing the user domain;
providing a virtual machine monitor on the physical hardware platform;
the virtual machine monitor:
analyzing operations performed by the user domain in real time,
storing resulting analysis information in the root domain;
detecting a memory access instruction of the user domain,
detecting that a number of previous access operations to the memory address exceeds a predetermined value, and
in response to upon detecting that the number of previous access operations to the memory address exceeds a predetermined value, converting a memory address of the memory access instruction into a different address.

16. The method of claim 15, wherein the memory address is an address of a NAND flash memory device.

17. The method of claim 15, further comprising tracing information regarding a current instruction of a virtual central processing unit of the root domain.

18. The method of claim 17, further comprising:
an instruction pointer (IP) tracker reading an instruction address stored in an instruction pointer register and reading information regarding the current instruction from a memory region indicated by the instruction address;
a decoder disassembling the information read by the IP tracker, and extracting from the information a data address of a memory reference;
an analyzer converting the instruction address to a first physical address and converting the data address to a second physical address based on a page table; and
a logger storing the instruction address, the first physical address, the data address, the second physical address, and the disassembled information.

19. The method of claim 15, wherein operating the user domain on the virtual hardware comprises:
executing a guest operating system on the virtual hardware; and
executing at least application program on the guest operating system.

20. The method of claim 19, further comprising:
analyzing operations performed by the guest operating system and the at least one application program of the user domain; and
determining a relationship between the guest operating system and the at least one application program of the user domain based on the analysis of the operations performed by the operating system and the application program of the user domain.

* * * * *